(12) United States Patent
Zhang

(10) Patent No.: US 11,668,978 B2
(45) Date of Patent: Jun. 6, 2023

(54) DISPLAY DEVICE

(71) Applicant: Wuhan China Star Optoelectronics Technology Co., LTD., Wuhan (CN)

(72) Inventor: Pengfei Zhang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/651,245

(22) PCT Filed: Nov. 12, 2019

(86) PCT No.: PCT/CN2019/117296
§ 371 (c)(1),
(2) Date: Mar. 26, 2020

(87) PCT Pub. No.: WO2021/031397
PCT Pub. Date: Feb. 25, 2021

(65) Prior Publication Data
US 2022/0382090 A1    Dec. 1, 2022

(30) Foreign Application Priority Data
Aug. 22, 2019 (CN) .......................... 201910778313.2

(51) Int. Cl.
*G02F 1/1335* (2006.01)
*G02F 1/13357* (2006.01)
(Continued)

(52) U.S. Cl.
CPC .... *G02F 1/13362* (2013.01); *G02F 1/133512* (2013.01); *G02F 1/133531* (2021.01);
(Continued)

(58) Field of Classification Search
CPC ........... G02F 1/13362; G02F 1/133553; G02F 1/133536; G02F 1/133548;
(Continued)

(56) References Cited

U.S. PATENT DOCUMENTS

2004/0264350 A1  12/2004 Ueki
2014/0051015 A1  2/2014 Gallagher et al.
(Continued)

FOREIGN PATENT DOCUMENTS

CN    1576907 A    2/2005
CN  101556397 A   10/2009
(Continued)

*Primary Examiner* — Angela K Davison
(74) *Attorney, Agent, or Firm* — Lowenstein Sandler LLP

(57) ABSTRACT

A display device is provided. The display device includes a display panel and a backlight module. The display panel includes sub-pixels and a light-shielding layer disposed around the sub-pixels. A reflective nano-grating is disposed on one side of the light-shielding layer near the backlight module. The backlight module provides a backlight source for the display panel, and the backlight source is converted into a polarized light in the display panel. The reflective nano-grating is used to reflect at least one part of the polarized light emitted toward the reflective nano-grating back to the backlight module for recycling.

14 Claims, 2 Drawing Sheets

(51) Int. Cl.
*G02F 1/1343* (2006.01)
*G02F 1/1368* (2006.01)

(52) U.S. Cl.
CPC .. *G02F 1/133553* (2013.01); *G02F 1/133602* (2013.01); *G02F 1/134345* (2021.01); *G02F 1/1368* (2013.01); *G02F 2201/307* (2013.01); *G02F 2201/50* (2013.01)

(58) Field of Classification Search
CPC ............ G02F 2201/307; G02B 5/3066; G02B 5/1861; G02B 5/3058; G02B 5/1809
See application file for complete search history.

(56) References Cited

U.S. PATENT DOCUMENTS

| | | | |
|---|---|---|---|
| 2018/0329255 A1 | 11/2018 | Zha | |
| 2019/0097099 A1* | 3/2019 | Guo | H01L 33/502 |
| 2019/0155106 A1* | 5/2019 | Lee | G02F 1/133514 |

FOREIGN PATENT DOCUMENTS

| | | | |
|---|---|---|---|
| CN | 103454807 A | 12/2013 | |
| CN | 104656306 A | 5/2015 | |
| CN | 105911630 A | 8/2016 | |
| CN | 105974648 A | 9/2016 | |
| CN | 106646954 A | 5/2017 | |
| CN | 106773086 A | 5/2017 | |
| CN | 106950635 A | 7/2017 | |
| CN | 106990596 A | 7/2017 | |
| KR | 20120130869 A | 12/2012 | |

\* cited by examiner

DISPLAY DEVICE

BACKGROUND OF DISCLOSURE

1. Field of Disclosure

The present disclosure relates to the field of display panel technology, and more particularly, to a display device.

2. Description of Related Art

Described herein background related to the present disclosure is merely provided without necessarily constituting conventional technologies.

Currently, a liquid crystal display device consists of a backlight module and a liquid crystal box. The backlight module includes a backlight source, a light guide plate, a diffuser sheet, and so on. The liquid crystal box includes a lower polarizer, a color filter, liquid crystals, thin film transistors, a glass, an upper polarizer, etc. When passing through each layer of mediums, the light emitted from the backlight source to the liquid crystal box is absorbed or reflected, and then a significant loss of light energy reaches a rate of 95%. The loss of light energy absorbed by materials is more serious. A black matrix layer disposed on one side of a color-film substrate to shade light also absorbs most of the light energy.

SUMMARY

A technical problem is that, the present disclosure provides a display device by disposing a reflective nano-grating with a reflection action on a light-shielding layer, solving a serious technical problem that a light energy loss of the display device is caused by most of light energy being absorbed by a light-shielding layer of a display panel.

In order to solve the above problem, the present disclosure provides a technical solution as follows:

The present disclosure provides a display device, including a display panel and a backlight module located on one side of the display panel; wherein the display panel includes sub-pixels and a light-shielding layer disposed around the sub-pixels, and a reflective nano-grating is disposed on one side of the light-shielding layer near the backlight module;

wherein the backlight module provides a backlight source for the display panel, and the backlight source is converted into a polarized light in the display panel; and wherein an included angle between a grating direction of the reflective nano-grating and a polarized direction of a polarized light emitted toward the reflective nano-grating is less than 90 degrees, so that at least one part of the polarized light emitted toward the reflective nano-grating is reflected back to the backlight module, and then the reflected polarized light is depolarized by the backlight module to be recycled.

In the display device of the present disclosure, the grating direction of the reflective nano-grating is parallel to the polarized direction of the polarized light emitted toward the reflective nano-grating.

In the display device of the present disclosure, an area of a vertical projection of the light-shielding layer over the display panel is equal to an area of a vertical projection of the reflective nano-grating over the display panel.

In the display device of the present disclosure, the display panel further includes an upper polarizing unit corresponding to the sub-pixels, and an included angle between a transparent axis of the upper polarizing unit and a transparent axis of the reflective nano-grating is greater than zero.

In the display device of the present disclosure, the transparent axis of the upper polarizing unit is perpendicular to the transparent axis of the reflective nano-grating.

In the display device of the present disclosure, the upper polarizing unit includes a transparent nano-grating, and a grating direction of the transparent nano-grating is perpendicular to a polarized direction of a polarized light emitted toward the reflective nano-grating and the transparent nano-grating.

In the display device of the present disclosure, a grating period, a grating duty ratio, and a grating height of the reflective nano-grating are the same as those of the transparent nano-grating.

In the display device of the present disclosure, a part of the sub-pixels cover edges of the reflective nano-grating.

In the display device of the present disclosure, the display panel further includes a first substrate and a second substrate, the sub-pixels and the light-shielding layer are located on one side of the first substrate near the second substrate, the upper polarizing unit is disposed on one side of the sub-pixels near the second substrate, and the backlight module is disposed on one side of the second substrate away from the first substrate.

In the display device of the present disclosure, the display panel further includes a lower polarizing unit, the transparent axis of the upper polarizing unit is perpendicular to a transparent axis of the lower polarizing unit, the lower polarizing unit is disposed on one side of the second substrate away from the first substrate, and the backlight module is located on one side of the lower polarizing unit away from the second substrate.

In the display device of the present disclosure, the display panel further includes a protective layer, a thin film transistor (TFT) array layer, and a liquid crystal layer located between the first substrate and the second substrate; wherein the sub-pixels and the light-shielding layer are located between the first substrate and the liquid crystal layer; wherein the protective layer covers the sub-pixels, the light-shielding layer, and the reflective nano-grating; and wherein the TFT array layer is located on one side of the second substrate near the liquid crystal layer.

An embodiment of the present disclosure further provides a display device, including a display panel and a backlight module located on one side of the display panel; wherein the display panel includes sub-pixels and a light-shielding layer disposed around the sub-pixels, and a reflective nano-grating is disposed on one side of the light-shielding layer near the backlight module;

wherein the backlight module provides a backlight source for the display panel, and the backlight source is converted into a polarized light in the display panel; and wherein a grating direction of the reflective nano-grating is parallel to a polarized direction of a polarized light emitted toward the reflective nano-grating, so that at least one part of the polarized light emitted toward the reflective nano-grating is reflected back to the backlight module, and then the reflected polarized light is depolarized by the backlight module to be recycled.

In the display device of the present disclosure, the display panel further includes an upper polarizing unit corresponding to the sub-pixels, and a transparent axis of the upper polarizing unit is perpendicular to a transparent axis of the reflective nano-grating.

In the display device of the present disclosure, the upper polarizing unit includes a transparent nano-grating, and a grating direction of the transparent nano-grating is perpendicular to the grating direction of the reflective nano-grating.

In the display device of the present disclosure, a grating period, a grating duty ratio, and a grating height of the reflective nano-grating are the same as those of the transparent nano-grating.

In the display device of the present disclosure, the display panel further includes a first substrate, a second substrate, and a lower polarizing unit; wherein the sub-pixels and the light-shielding layer are located on one side of the first substrate near the second substrate, and the upper polarizing unit is disposed on one side of the sub-pixels near the second substrate; and wherein the transparent axis of the upper polarizing unit is perpendicular to a transparent axis of the lower polarizing unit, the lower polarizing unit is disposed on one side of the second substrate away from the first substrate, and the backlight module is located on one side of the lower polarizing unit away from the second substrate.

The beneficial effect of the present disclosure is that, the reflective nano-grating with a reflection action is disposed on the light-shielding layer of the display panel, which can cause at least one part of the polarized light emitted toward the reflective nano-grating in the display panel to be reflected back to the backlight module. Then, the reflected polarized light is depolarized by the backlight module to be recycled, preventing the part of the polarized light from being absorbed by the light-shielding layer and improving light energy utility of the display device.

BRIEF DESCRIPTION OF DRAWINGS

In order to more clearly illustrate the embodiments of the present disclosure or technical solutions in conventional technologies, the drawings required for describing of the embodiments or conventional technologies will be briefly introduced below. It is obvious that the following drawings are merely some embodiments of the present disclosure, and a person having ordinary skill in this field can obtain other drawings according to these drawings under the premise of not paying creative works.

DETAILED DESCRIPTION OF EMBODIMENTS

Figure 1:
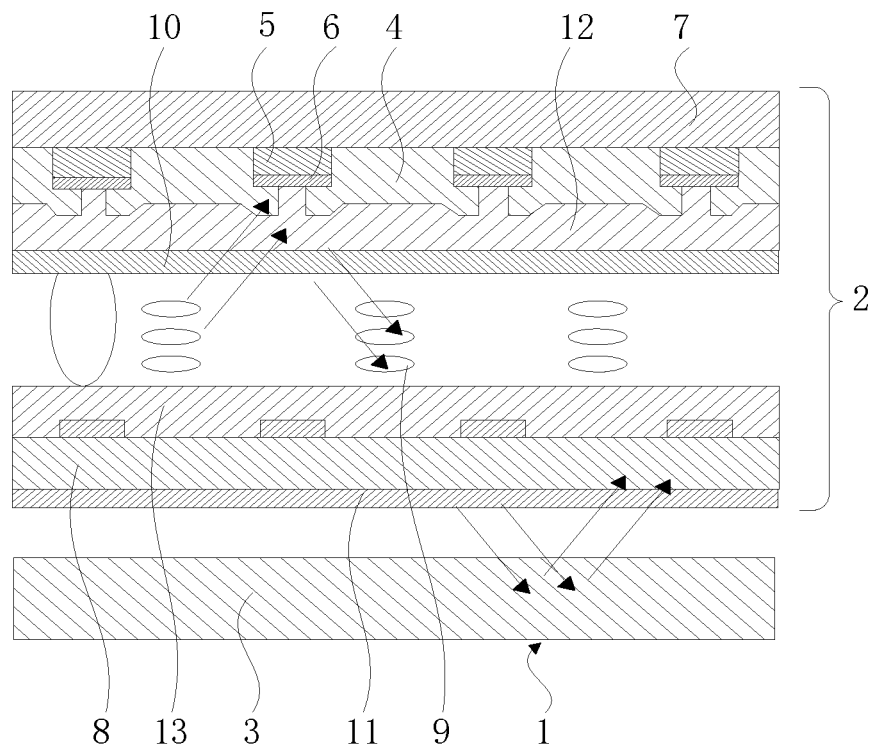
FIG. 1 is a schematic structural diagram of a display device according to an embodiment of the present disclosure.

The specific structure and function details disclosed herein are merely representative, and are intended to describe exemplary embodiments of the present application. However, the present application can be specifically embodied in many alternative forms, and should not be interpreted to be limited to the embodiments described here.

In the description of the present application, it should be understood that, orientation or position relationships indicated by the terms such as "center", "transversal", "upper", "lower", "left", "right", "vertical", "horizontal", "top", "bottom", "inner", "outer", etc. are based on the orientation or position relationships as shown in the drawings, merely for ease of the description of the present application and simplifying the description only, rather than indicating or implying that the indicated device or element must have a particular orientation or be constructed and operated in a particular orientation. Therefore, these terms should not to be understood as a limitation to the present application. In addition, the terms "first" and "second" are merely for a descriptive purpose, and cannot be understood to indicate or imply a relative importance, or implicitly indicate the number of the indicated technical features. Hence, the features defined by "first" and "second" can explicitly or implicitly include one or more of the features. In the description of the present application, "a plurality of" means two or more, unless otherwise stated. In addition, the term "comprise" and any variations thereof are intended to cover a non-exclusive inclusion.

In the description of the present application, it should be understood that, unless otherwise specified and defined, the terms "install", "connected with", and "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood for those skilled in the art according to specific circumstances.

The terms used herein are merely for the purpose of describing the specific embodiments, and are not intended to limit the exemplary embodiments. As used herein, the singular forms "a" and "an" are intended to include the plural forms as well, unless otherwise indicated in the context clearly. It will be further understood that the terms "comprise" and/or "include" used herein specify the presence of stated features, integers, steps, operations, elements and/or components, but do not preclude the presence or addition of one or more other features, integers, steps, operations, elements, components and/or combinations thereof.

The present application is further described below with reference to the accompanying drawings and embodiments.

Figure 2:
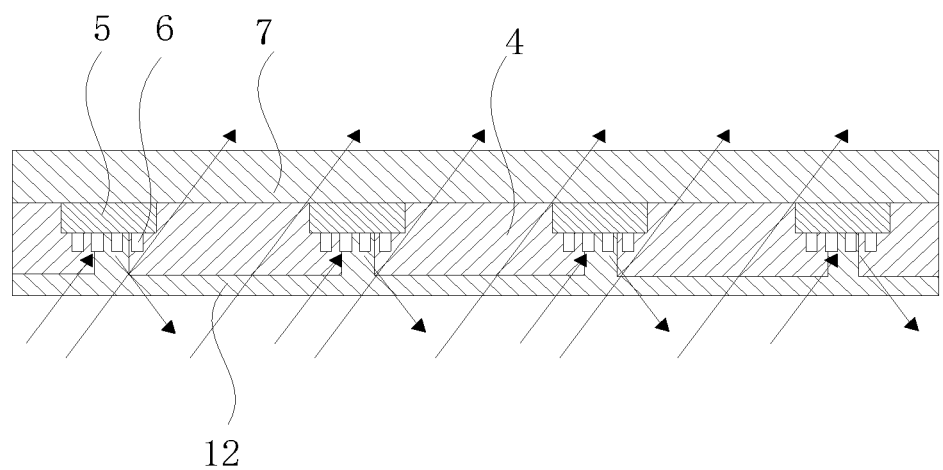
FIG. 2 is a schematic partial structural diagram of a display device according to an embodiment of the present disclosure.

As shown in FIGS. 1-2, an embodiment of the present disclosure provides a display device 1 including a display panel 2 and a backlight module 3 located on one side of the display panel 2. The display panel 2 includes sub-pixels 4 and a light-shielding layer 5 disposed around the sub-pixels 4. A reflective nano-grating 6 is disposed on one side of the light-shielding layer 5 near the backlight module 3. The backlight module 3 provides a backlight source for the display panel 2, and the backlight source is converted into a polarized light in the display panel 2. An included angle between a grating direction of the reflective nano-grating 6 and a polarized direction of a polarized light emitted toward the reflective nano-grating 6 is less than 90 degrees, so that at least one part of the polarized light emitted toward the reflective nano-grating 6 is reflected back to the backlight module 3, and then the reflected polarized light is depolarized by the backlight module 3 to be recycled.

Figure 3:
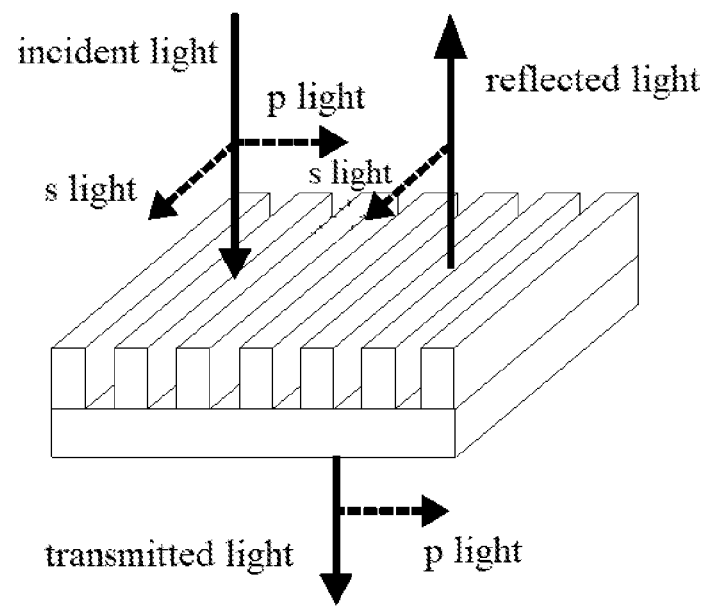
FIG. 3 is a schematic diagram of an exemplary subwavelength grating structure with transmitted light and reflected light.

Specifically, the reflective nano-grating 6 is of a subwavelength grating structure. A subwavelength grating is a grating with a grating period far less than a wavelength of incident light. As shown in FIG. 3, because of a very high extinction ratio for light field with transverse magnetic (TM) field and transverse electric (TE) field, the subwavelength grating structure can significantly reflect a TE polarized light (i.e., s light) parallel to an arrangement direction of metal lines through a TM polarized light (i.e., p light) perpendicular to the arrangement direction of the metal lines (i.e., grating), so that the subwavelength grating structure can be used as a reflective structure with a high reflection ratio. The material of the reflective nano-grating 6 includes metal.

Specifically, the sub-pixels 4 include red sub-pixels, green sub-pixels, and blue sub-pixels. The light-shielding layer 5 includes a black matrix (BM) layer.

Specifically, the display panel 2 further includes a first substrate 7 and a second substrate 8 opposite to each other, a liquid crystal layer 9 disposed between the first substrate 7 and the second substrate 8, an upper polarizing unit 10 corresponding to the sub-pixels 4, a lower polarizing unit 11, a protective layer 12, and a thin film transistor (TFT) array layer 13. The sub-pixels 4 and the light-shielding layer 5 are located on one side of the first substrate 7 near the second substrate 8. The protective layer 12 covers the sub-pixels 4, the light-shielding layer 5, and the reflective nano-grating 6. The upper polarizing unit 10 is located on the protective layer 12. The TFT array layer 13 is located on one side of the second substrate 8 near the liquid crystal layer 9. The lower polarizing unit 11 is located on one side of the second substrate 8 away from the first substrate 7. The backlight module 3 is located on one side of the lower polarizing unit 11 away from the second substrate 8. A transparent axis of the upper polarizing unit 10 is perpendicular to a transparent axis of the lower polarizing unit 11. It needs to be stated that the lower polarizing unit 11 is disposed on one side of the second substrate 8 away from the first substrate 7. The lower polarizing unit 11 can reflect the light source, which is not transmitted, back to the backlight module 3 and recycle the light source, thereby improving light energy utility of the display device 1. Of course, the upper polarizing unit 10 can be further disposed on one side of the first substrate 7 away from the liquid crystal layer 9. The lower polarizing unit 11 can be further disposed on one side of the second substrate 8 away from the backlight module 3. There is no limitation here.

Specifically, the first substrate 7 is an underlay substrate of a color-film substrate, and correspondingly, the second substrate 8 is an underlay substrate of an array substrate. Of course, the reflective nano-grating 6 of the present disclosure can be further applied to the light-shielding layer 5 of the display panel 2 which is a CF-on-Array-type (COA-type) panel.

Specifically, the backlight module 3 provides a backlight source for the display panel 2, and the backlight source is converted into a polarized light having a first polarized direction by the lower polarizing unit 11 of the second substrate 8. The polarized light having the first polarized direction enters the liquid crystal layer 9 through one side of the second substrate 8 and is electrically modulated by the liquid crystal layer 9. A polarized direction of the polarized light modulated electrically is a second polarized direction which is perpendicular to the first polarized direction. The polarized light having the second polarized direction emitted toward the reflective nano-grating 6 on the light-shielding layer 5 and toward the upper polarizing unit 10 on one side of the first substrate 7. In the embodiments of the present disclosure, the polarized light emitted toward the reflective nano-grating 6 in the display panel 2 means the polarized light having the second polarized direction and electrically modulated by the liquid crystal layer 9. The upper polarizing unit 10 is used to parse the polarized light modulated electrically in order to form a light and shade contrast, so that display pictures are generated. Thus, transmitted light passing through the upper polarizing unit 10 is emitted toward corresponding sub-pixels 4, and then colorful display pictures are generated. At least a part of the polarized light emitted toward the reflective nano-grating 6 is reflected. The reflected polarized light passes through the liquid crystal layer 9 and the lower polarizing unit 11 and then is emitted toward the backlight module 3. After being depolarized by the backlight module 3, the reflected polarized light is reflected back to the lower polarizing unit 11 on one side of the second substrate 8 and thus enters the display panel 2 again to be utilized.

In the present embodiment, the reflective nano-grating 6 with a reflection action is disposed on the light-shielding layer 5 of the display panel 2, which can cause at least one part of the polarized light emitted toward the reflective nano-grating 6 in the display panel 2 to be reflected back to the backlight module 3. Then, the reflected polarized light is depolarized by the backlight module 3 to be recycled, preventing the part of the polarized light from being absorbed by the light-shielding layer 5 and improving light energy utility of the display device 1.

In an embodiment, an area of a vertical projection of the light-shielding layer 5 over the display panel 2 is equal to an area of a vertical projection of the reflective nano-grating 6 over the display panel 2. That is to say, sizes and shapes of edges of the light-shielding layer 5 are exactly the same as those of edges of the reflective nano-grating 6.

In the present embodiment, the whole of the polarized light emitted toward the light-shielding layer 5 can be emitted on the light-shielding layer 5 and is reflected back to the backlight module 3 through the reflective nano-grating 6 for recycling, preventing a part of the polarized light emitted toward the light-shielding layer 5 from being directly absorbed by the light-shielding layer 5 and thus enlarging light energy utility. Of course, an area of a vertical projection of the light-shielding layer 5 over the display panel 2 is further greater than an area of a vertical projection of the reflective nano-grating 6 over the display panel 2. However, a part of the polarized light emitted toward the light-shielding layer 5 is directly absorbed by the light-shielding layer 5, and the light energy utility fails to be optimized.

In an embodiment, a part of the sub-pixels 4 cover the edges of the reflective nano-grating 6.

Specifically, the display panel 2 includes sub-pixels 4 arranged in an array, and the light-shielding layer 5 is disposed around each of the sub-pixels 4. A part of each sub-pixel 4 covers the edges of the reflective nano-grating 6 on two adjacent light-shielding layers 5.

Specifically, when the display panel 2 is prepared, first, the light-shielding layer 5 is formed on the first substrate 7. The light-shielding layer 5 has an opening region and a non-opening region. The first substrate 7 is exposed through the opening region. Then, the reflective nano-grating 6 is formed in the non-opening region of the light-shielding layer 5, and the sub-pixels 4 are formed in the opening region of the light-shielding layer 5.

In the present embodiment, the sub-pixels 4 overlap the edges of the reflective nano-grating 6. When an upper polarizing unit 10 corresponds to each sub-pixel 4 respectively, a vertical projection of the reflective nano-grating 6 over the display panel 2 overlaps a vertical projection of the upper polarizing unit 10 over the display panel 2, ensuring that a part of the polarized light electrically modulated by the liquid crystal layer 9 is emitted toward the upper polarizing unit 10 to display normally, and another part of the polarized light emitted toward the reflective nano-grating 6 is reflected back to be recycled. The polarized light emitted toward an overlap of the reflective nano-grating 6 and the upper polarizing unit 10 is still reflected back by the reflective nano-grating 6, preventing a part of the polarized light from passing through the middle of the reflective nano-grating 6 and the upper polarizing unit 10 and preventing stray light from affecting display effects of the display panel 2. In addition, the sub-pixels 4 overlap the edges of the reflective nano-grating 6, ensuring that the sub-pixels 4 and the light-shielding layer 5 overlap in a direction perpendicular to the display panel 2 and ensuring a light-shielding effect.

In an embodiment, an included angle between a transparent axis of the upper polarizing unit 10 and a transparent axis of the reflective nano-grating 6 is greater than zero. In the present embodiment, the reflective nano-grating 6 is used to reflect the polarized light electrically modulated by the liquid crystal layer 9 and then emitted toward the reflective nano-grating 6. The upper polarizing unit 10 allow the polarized light electrically modulated by the liquid crystal layer 9 and emitted toward the upper polarizing unit 10 to pass. As a polarized direction of the polarized light emitted toward the reflective nano-grating 6 is the same as that of the polarized light emitted toward the upper polarizing unit 10, the included angle between the transparent axis of the upper polarizing unit 10 and the transparent axis of the reflective nano-grating 6 is greater than zero, preventing that the transparent axis of the upper polarizing unit 10 is parallel to the transparent axis of the reflective nano-grating 6. The polarization effect of the upper polarizing unit 10 and the reflection effect of the reflective nano-grating 6 are guaranteed.

An embodiment of the present disclosure further provides a display device 1. The difference between the present embodiment and the above embodiment is that, a grating direction of the reflective nano-grating 6 is parallel to a polarized direction of a polarized light emitted toward the reflective nano-grating 6 in the display panel 2. That is, the transparent axis of the reflective nano-grating 6 is perpendicular to the polarized direction of the polarized light emitted toward the reflective nano-grating 6 in the display panel 2.

In the present embodiment, because a nano-grating structure has an efficient light component selectively using TM polarization, the property of light component using TE polarization is reflected. Therefore, that the grating direction of the reflective nano-grating 6 is parallel to the polarized direction of the polarized light emitted toward the reflective nano-grating 6 can improve the reflection effect to realize a high reflection ratio, and thus the light energy utility of the display device 1 is further improved.

In an embodiment, the transparent axis of the upper polarizing unit 10 is perpendicular to the transparent axis of the reflective nano-grating 6. That is, the transparent axis of the upper polarizing unit 10 is parallel to the polarized direction of the polarized light emitted toward the reflective nano-grating 6, guaranteeing that the polarized light emitted toward the upper polarizing unit 10 has a high transparency when passing through the upper polarizing unit 10. Thus, in the embodiment of the present disclosure, the polarized light emitted toward the upper polarizing unit 10 has a high transparency, and the polarized light emitted toward the reflective nano-grating 6 has a high reflection ratio. Not only is a better polarization effect realized, but a better reflection effect is also realized. Light energy utility is improved on the basis of guaranteeing the display effect of the display device 1.

Figure 4:
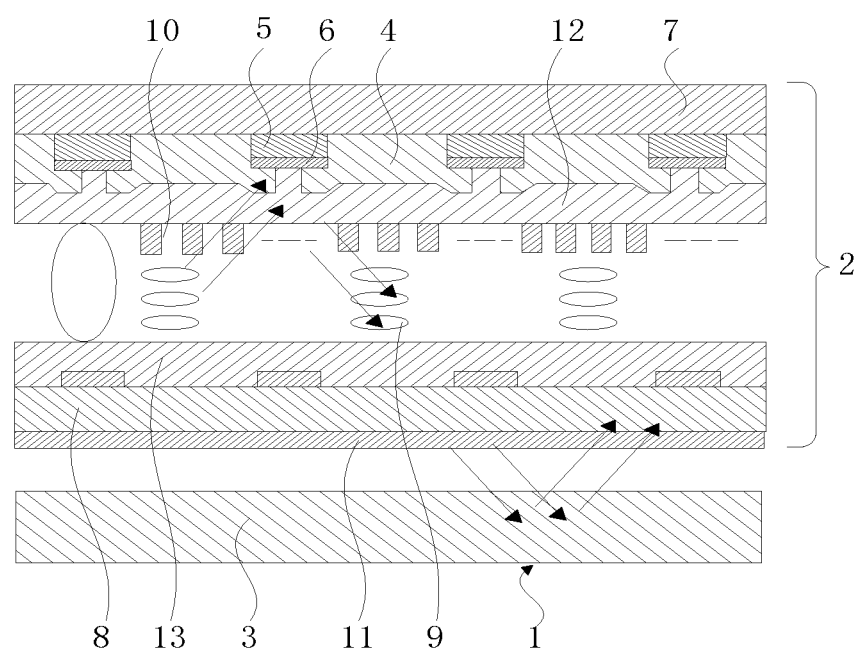
FIG. 4 is a schematic structural diagram of another display device according to an embodiment of the present disclosure.

As shown in FIG. 4, an embodiment of the present disclosure further provides a display device 1. The difference between the present embodiment and the above embodiment is that, the upper polarizing unit 10 includes a transparent nano-grating, and a grating direction of the transparent nano-grating is perpendicular to the polarized direction of the polarized light emitted toward the reflective nano-grating 6 in the display panel 2.

Specifically, the lower polarizing unit 11 can be a common polarizer and can also be of a nano-grating structure which can be the same as a grating structure of the upper polarizing unit 10. The transparent axis of the upper polarizing unit 10 is perpendicular to the transparent axis of the lower polarizing unit 11, thereby guaranteeing a good polarization effect.

In the present embodiment, because a nano-grating structure has an efficient light component selectively using TM polarization, the property of light component using TE polarization is reflected. That the transparent nano-grating is used as the upper polarizing unit 10 can improve the transparency of the polarized light in the upper polarizing unit 10, and thus the light energy utility of the display device 1 is improved.

In an embodiment, a grating period, a grating duty ratio, and a grating height of the reflective nano-grating 6 are the same as those of the transparent nano-grating (i.e., the upper polarizing unit 10).

Specifically, a transparent axis of the transparent nano-grating is perpendicular to the transparent axis of the reflective nano-grating 6. That is, a grating direction of the transparent nano-grating is perpendicular to the grating direction of the reflective nano-grating 6. For example, the grating direction of the reflective nano-grating 6 is a horizontal direction, and the grating direction of the transparent nano-grating is a vertical direction.

In the present embodiment, a grating structure of the reflective nano-grating 6 is the same as the grating structure of the upper polarizing unit 10. Thus, they can be made by the same manufacturing process, improving product efficiency. It is beneficial to save product costs.

In conclusion, although the present disclosure has been described with reference to the foregoing preferred embodiments thereof, it is not limited to the foregoing preferred embodiments. It is apparent to those skilled in the art that a variety of modifications and changes may be made without departing from the scope of the present disclosure which is intended to be defined by the appended claims.

What is claimed is:

1. A display device, comprising a display panel and a backlight module located on one side of the display panel; wherein the display panel comprises sub-pixels and a light-shielding layer disposed around the sub-pixels, and a reflective nano-grating is disposed on one side of the light-shielding layer near the backlight module; wherein the backlight module provides a backlight source for the display panel, and the backlight source is converted into a polarized light in the display panel; and wherein an included angle between a grating direction of the reflective nano-grating and a polarized direction of a polarized light emitted toward the reflective nano-grating is less than 90 degrees, so that at least one part of the polarized light emitted toward the reflective nano-grating is reflected back to the backlight module, and then the reflected polarized light is depolarized by the backlight module to be recycled;

wherein an area of a vertical projection of the light-shielding layer over the display panel is equal to an area of a vertical projection of the reflective nano-grating over the display panel.

2. The display device of claim 1, wherein the grating direction of the reflective nano-grating is parallel to the polarized direction of the polarized light emitted toward the reflective nano-grating.

3. The display device of claim 1, wherein a part of the sub-pixels cover edges of the reflective nano-grating.

4. The display device of claim 1, wherein the display panel further comprises an upper polarizing unit corresponding to the sub-pixels, and an included angle between a transparent axis of the upper polarizing unit and a transparent axis of the reflective nano-grating is greater than zero.

5. The display device of claim 4, wherein the transparent axis of the upper polarizing unit is perpendicular to the transparent axis of the reflective nano-grating.

6. The display device of claim 4, wherein the upper polarizing unit comprises a transparent nano-grating, and a grating direction of the transparent nano-grating is perpendicular to a polarized direction of a polarized light emitted toward the reflective nano-grating and the transparent nano-grating.

7. The display device of claim 6, wherein a grating period, a grating duty ratio, and a grating height of the reflective nano-grating are the same as those of the transparent nano-grating.

8. The display device of claim 4, wherein the display panel further comprises a first substrate and a second substrate, the sub-pixels and the light-shielding layer are located on one side of the first substrate near the second substrate, the upper polarizing unit is disposed on one side of the sub-pixels near the second substrate, and the backlight module is disposed on one side of the second substrate away from the first substrate.

9. The display device of claim 8, wherein the display panel further comprises a lower polarizing unit, the transparent axis of the upper polarizing unit is perpendicular to a transparent axis of the lower polarizing unit, the lower polarizing unit is disposed on one side of the second substrate away from the first substrate, and the backlight module is located on one side of the lower polarizing unit away from the second substrate.

10. The display device of claim 8, wherein the display panel further comprises a protective layer, a thin film transistor (TFT) array layer, and a liquid crystal layer located between the first substrate and the second substrate; wherein the sub-pixels and the light-shielding layer are located between the first substrate and the liquid crystal layer; wherein the protective layer covers the sub-pixels, the light-shielding layer, and the reflective nano-grating; and wherein the TFT array layer is located on one side of the second substrate near the liquid crystal layer.

11. A display device, comprising a display panel and a backlight module located on one side of the display panel; wherein the display panel comprises sub-pixels and a light-shielding layer disposed around the sub-pixels, and a reflective nano-grating is disposed on one side of the light-shielding layer near the backlight module; wherein the backlight module provides a backlight source for the display panel, and the backlight source is converted into a polarized light in the display panel; and wherein a grating direction of the reflective nano-grating is parallel to a polarized direction of a polarized light emitted toward the reflective nano-grating, so that at least one part of the polarized light emitted toward the reflective nano-grating is reflected back to the backlight module, and then the reflected polarized light is depolarized by the backlight module to be recycled;

wherein the display panel further comprises an upper polarizing unit corresponding to the sub-pixels, and a transparent axis of the upper polarizing unit is perpendicular to a transparent axis of the reflective nano-grating.

12. The display device of claim 11, wherein the display panel further comprises a first substrate, a second substrate, and a lower polarizing unit; wherein the sub-pixels and the light-shielding layer are located on one side of the first substrate near the second substrate, and the upper polarizing unit is disposed on one side of the sub-pixels near the second substrate; and wherein the transparent axis of the upper polarizing unit is perpendicular to a transparent axis of the lower polarizing unit, the lower polarizing unit is disposed on one side of the second substrate away from the first substrate, and the backlight module is located on one side of the lower polarizing unit away from the second substrate.

13. The display device of claim 11, wherein the upper polarizing unit comprises a transparent nano-grating, and a grating direction of the transparent nano-grating is perpendicular to the grating direction of the reflective nano-grating.

14. The display device of claim 13, wherein a grating period, a grating duty ratio, and a grating height of the reflective nano-grating are the same as those of the transparent nano-grating.

\* \* \* \* \*